(12) United States Patent
Pettit (10) Patent No.: US 8,380,018 B2
(45) Date of Patent: Feb. 19, 2013

(54) CONDUCTIVE COATING BASED ON POLYMER-CARBON NANOTUBE COMPOSITE

(76) Inventor: John W. Pettit, Rockville, MD (US)

( * ) Notice: Subject to any disclaimer, the term of this patent is extended or adjusted under 35 U.S.C. 154(b) by 0 days.

(21) Appl. No.: 13/152,857

(22) Filed: Jun. 3, 2011

(65) Prior Publication Data

US 2011/0293218 A1  Dec. 1, 2011

Related U.S. Application Data

(62) Division of application No. 12/153,177, filed on May 14, 2008.

(60) Provisional application No. 60/924,407, filed on May 14, 2007.

(51) Int. Cl.
*G02F 1/295* (2006.01)
*G02B 6/34* (2006.01)

(52) U.S. Cl. ......... 385/10; 385/4; 385/8; 385/9; 385/12; 385/15; 385/16; 385/31; 385/37

(58) Field of Classification Search .................. 385/8, 9, 385/10, 12
See application file for complete search history.

(56) References Cited

U.S. PATENT DOCUMENTS

2005/0248768 A1 * 11/2005 Pettit .............................. 356/432
2010/0142017 A1 *  6/2010 Stevens ......................... 359/108

OTHER PUBLICATIONS

Zhang et al, "Transparent, Conductive, and Flexible Carbon Nanotube Films and Their Application in Organic Light-Emitting Diodes", Nano Letters, Aug. 12, 2006.*
Moon et al, "Transparent conductive film based on carbon nanotubes and PEDOT composites", Science Direct, Aug. 25, 2005.*
Pasqueir et al, "Conducting and transparent single-wall carbon nanotube electrodes for polymer-fullerene solar cells", Applied Physics Letters, Nov. 10, 2005.*
Bush, Steve, "Graphene to Replace ITO in LCSs?," electronicsweekly.com/Articles/2008/04/30/43638/graphene-to-replace-ito-in- icds.htm.

* cited by examiner

*Primary Examiner* — Ryan Lepisto
(74) *Attorney, Agent, or Firm* — Blank Rome LLP (57) ABSTRACT

A conductive polymer and a semiconducting carbon nanotube material are combined to form a highly conductive composite. The composite can be used for EMI shielding, optical sensing, optical switching, and other uses.

2 Claims, 7 Drawing Sheets

CONDUCTIVE COATING BASED ON POLYMER-CARBON NANOTUBE COMPOSITE

REFERENCE TO RELATED APPLICATION

The present application is a divisional of U.S. patent application Ser. No. 12/153,177, filed on May 14, 2008, currently pending, which claims the benefit of U.S. Provisional Patent Application No. 60/924,407, filed on May 14, 2007, whose disclosures are hereby incorporated by reference in their entireties into the present disclosure.

FIELD OF THE INVENTION

The present invention is directed to a conductive coating based on a composite of a conducting polymer and a carbon nanotube material.

DESCRIPTION OF RELATED ART

With the increased use of composite materials in aircraft construction, the electrical shielding properties of conventional aluminum or metal skin are becoming lost. Another major problem is that maintaining sound electrical shielding after years of service is extremely problematic with conventional metal based shields, due to corrosion effects, which tend to electrically isolate portions of the shield, rendering those portions useless for electrical shielding purposes. This phenomenon is extremely difficult to detect and diagnose in the field and is felt to be a vulnerability. Polymer and nanocomposite based shielding will not have the corrosion issue and potentially offer stronger, and significantly greater resistance to flexure and wear, especially if the exceptionally strong carbon nanotubes can be incorporated into the composite.

In another field of endeavor, recently carbon nanotubes have been combined with polymers to create composites that have extraordinary properties, typically much greater strength or other physical attributes. It has been found that very small amounts of carbon nanotubes, sometimes on the order of fractions of one percent, can make a huge difference in the resultant composite material.

Recently as well multiwalled or metallic carbon nanotubes have been combined with conducting polymers to provide an additional conduction path to aid in allowing the charge to flow through the material. When a certain percent of carbon nanotubes is reached, the "percolation threshold", the intertwined network of carbon nanotubes creates a continuous path for the charge to follow from one side of the composite material to the other.

Steve Bush, "Graphene to replace ITO in LDCs?", *Electronics Weekly*, 30 Apr. 2008, discusses replacing the current standard transparent conductive coating material Indium-Tin-Oxide, ITO, with graphene. Graphene is pretty close to carbon nanotubes, as it is just the flat version of sp2 bonded carbon, whereas carbon nanotubes are graphene rolled into a tube. ITO is what is used pretty much whenever transparent conducting films and coatings are needed.

SUMMARY OF THE INVENTION

Conducting polymer and nano-materials based composites that are electrically conductive while at the same time offering advantages of light weight, corrosion resistance, durability and long service lifetime are very valuable. The primary objective of the present invention is to achieve coatings that offer lightning protection and electromagnetic interference, EMI, immunity as well as electrical shielding, but there are other important, and similar objectives that will be met with conductive coatings of this type, where the conductivity can be controlled by several means.

The technical approach that is proposed herein is to use intrinsically conductive polymers based on the $\pi$ conjugated ring, with the delocalized bond formed by the overlapping $\pi$ electron orbitals, in conjunction with semiconducting single walled carbon nanotubes. This combination has been found through extensive research to offer a number of benefits over other combinations of conducting polymers and nanomaterials.

Intrinsically conducting polymers need a mechanism that brings about a "doping" action, a term that has traditionally applied in semiconductor technology to describe the action of an impurity in, for instance, a crystal of silicon that can either add electrons to the conduction band or remove an electron from the valence band creating a mobile hole. Whereas there are conceptual similarities, the situation with intrinsically conducting polymers is different. The $\pi$ electron, or its conceptual counterpart, a hole, can move along the backbone of the polymer to create a one dimensional conductor. The extra electron or hole has to be created by a source or sink for electrons and this is done by charge transfer doping. This form of doping is accomplished by putting something that has charge to give or take in close proximity to the conducting polymer so that charge transfer takes place. Numerous chemicals are reported in the literature for this purpose, such as Glycerol, Lithium, Iodine, etc.

The inventor has created passive optical sensors using carbon nanotubes. The principle of these sensors is to select a semiconducting carbon nanotube with a bandgap that gives an optical absorption at a convenient optical wavelength compatible with the fiber optic network being employed and then modulate the strength of the direct bandgap optical transition by the physical parameter that is being sensed by this passive optical sensor.

The first designs used a liquid electrolyte to carry charge to the surface of the carbon nanotube that would alter the Fermi level of the carbon nanotube and change the number of states which could participate in the optical transition and thereby modulate the strength of the optical absorption line. This design worked very well from all points of view except one. A liquid based sensor was not very practical for use in aircraft, so the inventor looked for an alternative to the liquid electrolyte.

After some researching, the inventor decided to use conductive polymers as the charge transfer agent that could bring charge to the surface of the carbon nanotube through an electrode which was attached to the source of the signal that was intended to be measured by the sensor. The inventor had to overcome a series of obstacles in order to achieve this goal, and about one year of solid effort has been expended in order to have a solution in place.

The first problem is that at the nanoscale, forces that are typically very small and irrelevant, such as the Van der Walls forces, become very significant, owing to the large surface are to volume ratio of nanomaterials in general. This causes carbon nanotubes, as well as conductive polymers, which have a similar problem, to cling together and not disperse in most solvents. This makes is very impractical to work with them to form devices and structures that may be desired.

The inventor read that single stranded DNA, ssDNA, which has a hydrophobic surface where the nucleotides bind, and a hydrophilic surface where the phosphate group is exposed, solved this problem very well. The single stranded DNA wrapped itself around the carbon nanotube, as the hydrophobic surface of the carbon nanotubes energetically favored the hydrophobic surface of the single stranded DNA. This left the hydrophilic surface of the DNA exposed and this carbon nanotube-ssDNA hybrid then easily formed a dispersion in water as the solvent.

The inventor reviewed the various available conducting polymers and chose the thiophene based PEDOT, commercially available from Bayer as Baytron as a suitable conducting polymer, as it is available in the PEDOT-PSS form that is water soluble. When the carbon nanotube-ssDNA dispersion was added to the PEDOT-PSS, the desired result of charge transfer did not occur.

It turned out that the PEDOT still needed to be doped so that it could carry the charge from the electrode to the surface of the carbon nanotubes and affect charge transfr to the carbon nanotubes. After exploring means to dope the PEDOT, the issue becomes one of finding a common solvent that the carbon nanotube would disperse in as well as the PEDOT along with its doping agent. A methanol based system was tried which appeared to make good dispersions, but the charge transfer was still not taking place.

The inventor wondered if the carbon nanotubes and the PEDOT were in close enough proximity with their respective dispersion agent to bring about charge transfer between the carbon nanotubes and the PEDOT. The two materials need to be within about a nanometer or so of one another for this purpose.

Finally the inventor took raw as received semiconducting carbon nanotubes and combined them with PEDOT in a methanol solvent and found remarkable results. The PEDOT appeared to wrap itself around the carbon nanotubes and become the dispersion agent, as the carbon nanotubes with a reasonable amount of sonication formed a uniform dispersion. This is relatively easy to conclude, since if they do not form a dispersion, they drop to the bottom of the vial like little charcoal bricks. The inventor confirmed that a good dispersion was achieved by optical absorption spectroscopy.

The next thing observed is where a bit of discovery took place. Neither the PEDOT nor the carbon nanotubes were doped and by themselves they displayed low conductivity. However, when combined and dispersed together, the result was a highly conducting film!

The inventor has studied the literature and concludes that the PEDOT and carbon nanotubes effectively dope each other when in intimate contact. The conducting polymer prefers to be "P" doped and display hole conduction, whereas the carbon nanotube with its large electron affinity, wants to accept an electron and become an "N" type conductor. Therefore, an electron transfers from the conducting polymer PEDOT to the carbon nanotube and each are doped so that they conduct.

This made the passive optical sensor work, but it also discovers a new class of conducting polymer film, as the inventor is not aware of any research reports prior to his own invention where semiconducting single walled carbon nanotubes have been combined in this fashion with conducting polymers. To give an indication of how well this composite conducts, a thin film that was created by simply using a micropipette to drop about 20 microliters of solution onto a glass microscope slide. This was allowed to dry in air with a little help from the heat of a heat gun for about five minutes. The resultant film was about 20 microns thick and was a circle about the size of a quarter. The resistance was measured across the diameter of this film with a digital multimeter to be about just under 6 thousand Ohms.

The advantages of this nanocomposite film based on a conducting polymer dispersed together with a semiconducting carbon nanotube are the potential for enhanced conductivity and the attendant strength and durability offered at the same time by the carbon nanotubes. Other composites where, for instance, metallic carbon nanotubes have been combined with the conducting polymer only added the metallic nanotubes as an additional charge path. They were not included to be wrapped with the conducting polymer and did not enhance the conduction of the polymer by a charge transfer doping action. Carbon nanotubes have an axial Young's modulus of over 100 GPa, so they offer tremendous strength and their covalent carbon-carbon bond seems to be able to withstand flexure or cyclic bending for an indefinite period of time. Further research has shown that other intrinsically conducting polymers in various solvents achieved similar results with different useful characteristics. The conducting polymer Poly (2-methoxy-5-(2'-ethylhexyloxy)-1,4-phenylenevinylene), MEH-PPV, in a tetrahydrofuran, THF, solvent also showed remarkable properties to disperse carbon nanotubes and form highly conductive films. With the higher bandgap of MEH-PPV in the range of 2 electron volts or greater, as compared to the bandgap of around one electron volt for PEDOT, it was found that optical properties of semiconducting carbon nanotubes could be more readily utilized, since many of the carbon nanotubes with diameters in the range of one nanometer had bandgaps around one electron volt that overlapped with the bandgap of PEDOT. With semiconducting carbon nanotubes with bandgaps in the one electron volt range that yielded optical transition across the first van Hove singularities at around a one micron wavelength, which is very convenient for near infrared and fiber optic applications, the MEH-PPV based carbon nanotube composites demonstrated enhanced optical effects. The band alignment due to the electron affinity of MEH-PPV relative to carbon nanotubes aligned the bandgap of the carbon nanotubes such that effective electron transfer between the MEH-PPV and the carbon nanotubes would take place. The allowed better control over the optical transition strength and the related optical index of refraction, as well as the electrical conductivity of the composite film.

In light of the theory and discussion above, it is further recognized that the degree of electrical conductivity of the polymer—semiconducting carbon nanotube film can be controlled by controlling the degree to which charge transfer occurs through the polymer and onto the carbon nanotubes. This control may be affected by placing an electrical voltage or charge onto the film directly by affixing a contact electrode or by inducing a charge through the creation of a capacitive effect by providing a counter electrode surface separated by a dielectric layer. Alternately, the charge transfer to the carbon nanotubes may be affected optically or by other types of ionizing or non-ionizing radiation by directing the radiant energy to the surface of the film where the radiation is absorbed by the polymer to create a free charge that then transfers to the carbon nanotubes.

It is further recognized that the control over the electrical conductivity of the polymer-semiconducting carbon nanotube film through Fermi level modulation within the carbon nanotubes would alter the optical properties of the carbon nanotubes. This modulation of the carbon nanotube's optical properties may also be brought about by the screening effect of the charge on the excition state associated with the carbon nanotube's optical transition. This effect will also change the index of refraction of the carbon nanotube through the well known Kramers-Kronig relations. The practical use of these properties is to create films that can refract light in a controlled manner. This has practical use in optical switching, where for instance the film is disposed between two optical waveguides and the degree of light that couples into one fiber versus the other can be controlled through the electrical control of the index of refraction of the carbon nanotube film.

The response of the polymer to the applied radiation can be tailored to make the film's conductivity responsive to only certain types of radiation or certain wavelength regions of radiation by the inclusion of sensitizing agents. These agents are either applied in a film on top of the polymer—semiconducting carbon nanotube layer or they may be mixed with the polymer or mixed with the polymer—semiconducting carbon nanotube dispersion prior to the formation of the film. Alternatively these agents may be chemically attached or bonded to the polymer prior to the formation of the dispersion and creation of the film. A typical agent to be used for this purpose is a quantum dot, whose properties have been chosen such that the quantum dots preferentially absorbs the radiation to create an internal electron—hole pair that prefers to shed this energy by the transfer of charge out of the quantum dot as opposed to a recombination process within the quantum dot. The charge transferred from the quantum dot is made to go to the polymer through matching of the band levels and electron affinity of the polymer such that this charge transfer is most likely to occur.

BRIEF DESCRIPTION OF THE DRAWINGS

Preferred embodiments of the invention will be set forth in detail with reference to the drawings, in which.

DETAILED DESCRIPTION OF THE PREFERRED EMBODIMENTS

Preferred embodiments of the present invention will be set forth in detail with reference to the drawings, in which like reference numerals refer to like elements or steps throughout.

Figure 1:
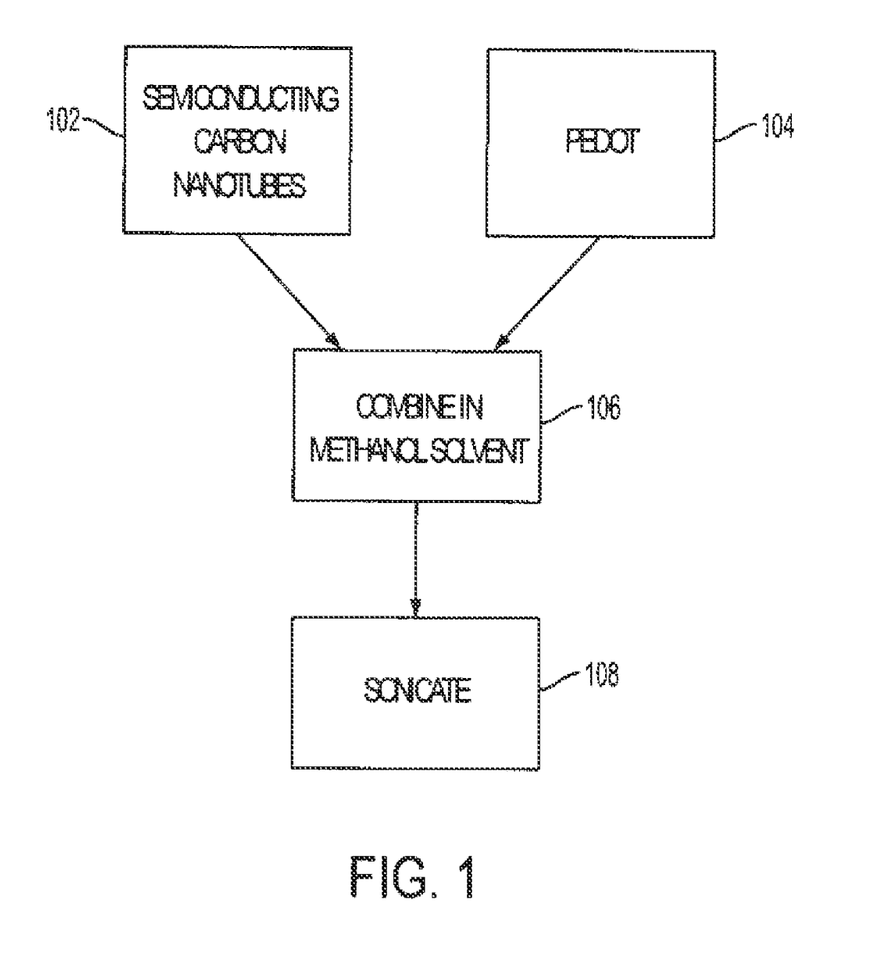
FIG. 1 is a flow chart showing a method of forming the film.

FIG. 1 is a flow chart showing a preferred process of forming the conducting film.

Semiconducting carbon nanotubes are provided in step 102, and PEDOT or another suitable polymer is provided in step 104. They are mixed in methanol or another suitable solvent in step 106 and sonicated in step 108. As noted above, a highly conductive film results.

Films such as the type described above would find numerous applications that will have commercial value. One such application is the creation of a film that would have the properties of providing an image of the light or ionizing radiation that impinges the film. This would have enormous application is the areas of Homeland Security to detect radiation from nuclear materials or in the area of night vision where an effective night vision goggle can be created. The present generation night vision goggles use bulky image intensifier tubes that need high voltage and are rather large and heavy.

Figure 2:
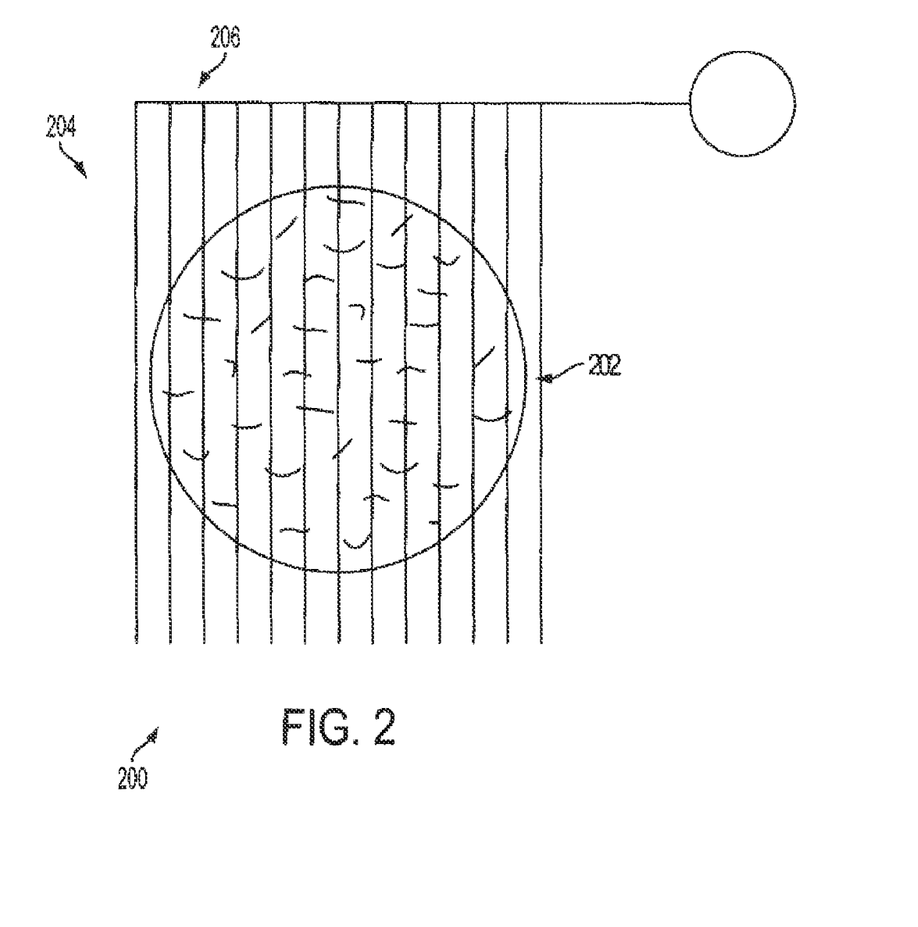
FIG. 2 shows a sensor using the film.

FIG. 2 shows how an optical image sensor 200 using an optically controlled conducting polymer-semiconducting carbon nanotube film 202 can be economically made in a very small and compact manner by placing the film between two electrode arrays 204, 206. These electrode arrays work in a well know way to address the individual regions of the film, which could be called pixels in this case, by creating a conduction path between the selected pair of electrodes that gives a return signal that is proportional to the conduction state of the polymer-semiconducting carbon nanotube film that is between the two selected electrodes.

Figure 3A:
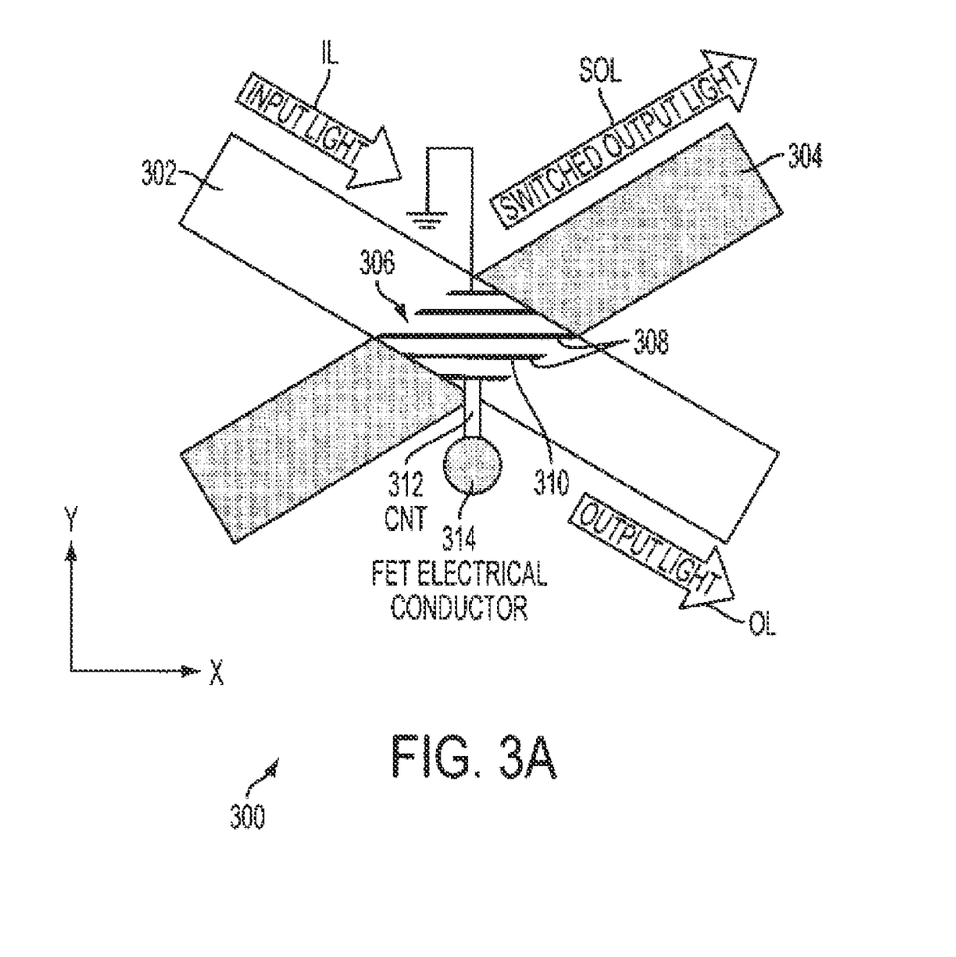
FIGS. 3A-3D show an optical switch using the film.

FIG. 3A illustrates the concept of using the electrical control over the carbon nanotube's electrical and thus optical property of index of refraction to form a very effective optical switch 300 using crossed optical waveguides 302, 304 and a Bragg grating 306. The degree of refraction of the Bragg grating will be determined by the index of refraction of the carbon nanotube film layers 308 relative to the fixed index of refraction of the material 310 interposed between the carbon nanotube film surfaces. The carbon nanotube refractive index response to the applied field is inferred from known changes in the carbon nanotube absorption responsive to the electric field and the general observation that the refractive index has real and imaginary components corresponding to phase and absorption. The carbon nanotube film index of refraction is controlled by the application of a voltage applied through a carbon nanotube conductor 312 and a FET 314, and this voltage becomes the control voltage to make the input light IL switch between the two optical waveguides (that is, between the output light OL and the switched output light SOL) under the control of this voltage.

Figure 3B:
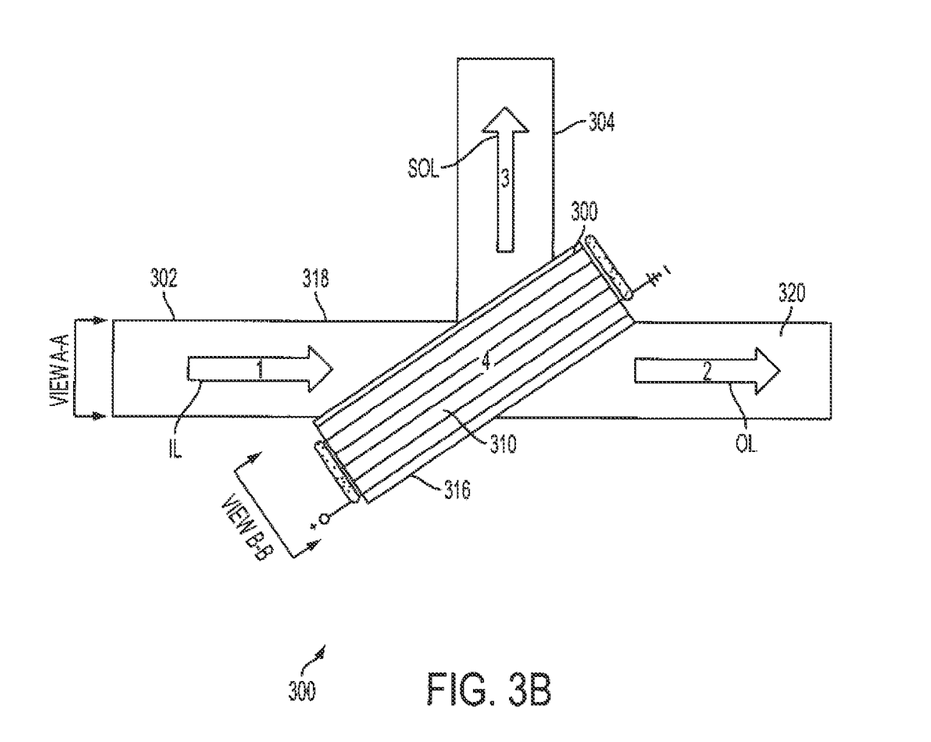

As shown in FIG. 3B, the carbon nanotube layers 308 and material 310 are formed as a switch module 316. The waveguide 302 is divided between an input waveguide 318 and an output waveguide 320. The input light waveguide 318 carries light IL with a 40 GHz modulation bandwidth. Depending on the switching of the module 316, the light can be switched between OL and SOL.

An optical switch that is voltage or charge controlled will have enormous impact on the fields of optical communication, optical computing, and optical interconnections, where there is presently no viable means to control the switching of optical signals between optical paths in a manner analogous to electrical switching of signals.

Figure 3C:
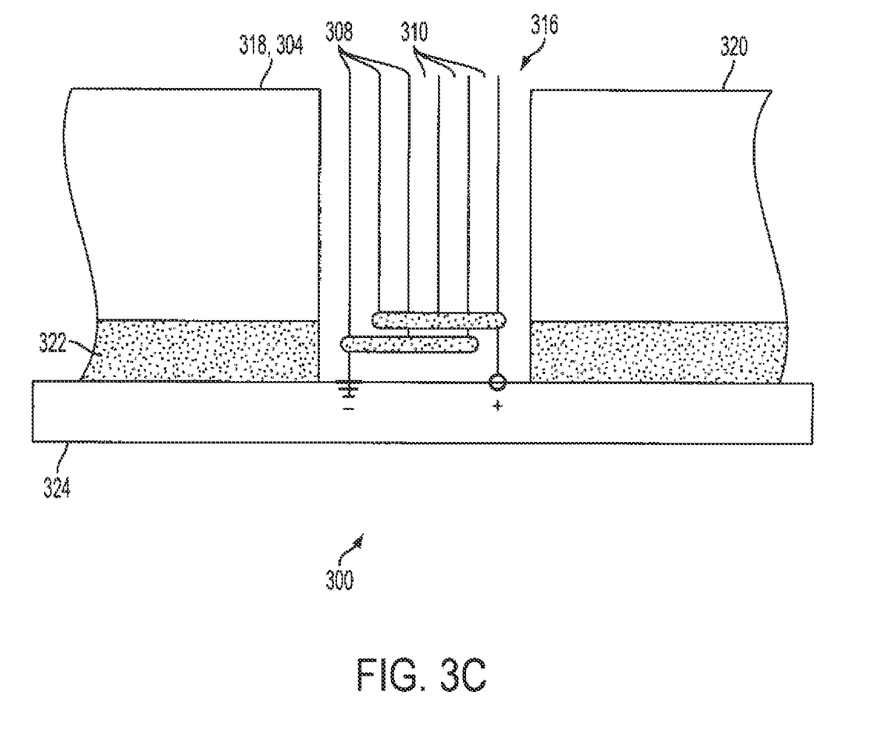
Figure 3D:
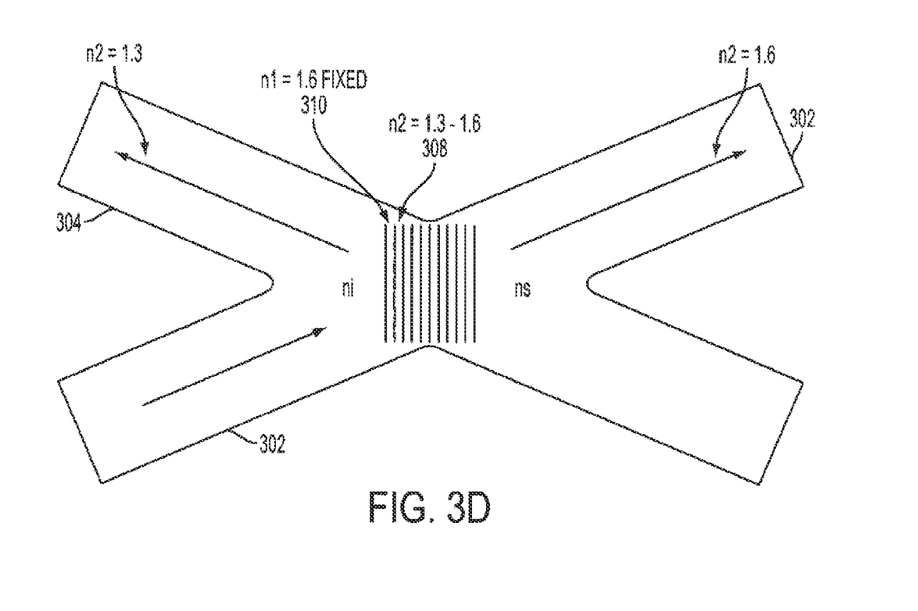

The B-B view detail of FIG. 3C shows the Bragg grating created by the carbon nanotube film 308 whose index of refraction is voltage controlled and another film 310 whose index of refraction is not responsive to voltage. Any common material such as glass, or an oxide of silicon can be used for this second film surface. Substrates 322, 324 are also shown. FIG. 3D is a detail of the interaction region of the two crossed optical waveguides with the carbon nanotube composite Bragg grating created at the intersection region. All dimensions are in microns.

Figure 4:
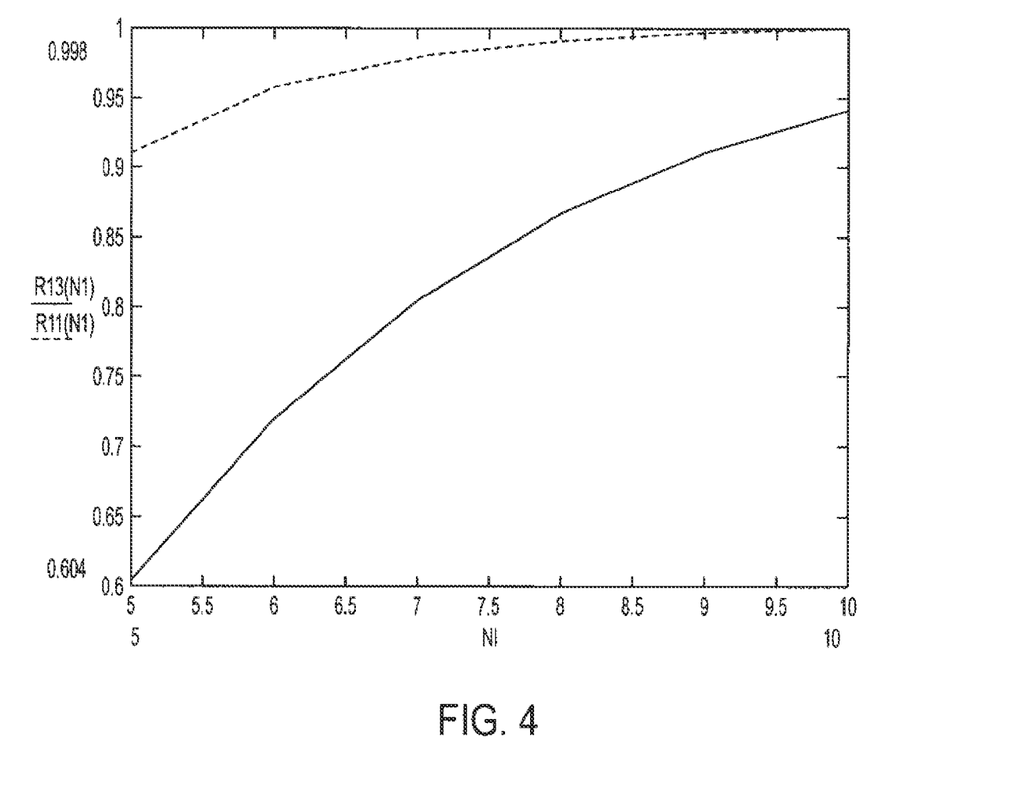
FIG. 4 is a plot showing the effectiveness of the switch of FIGS. 3A-3D.

FIG. 4 shows a MathCAD model of the interaction using the known equations for a Bragg grating with two regions of known optical index of refractions, n1 and n2. The curves represent the reflection coefficient as a function of the number of alternating layers N1 for n1=1.6 and n2 in the range of 1.3 to 1.6.

While preferred embodiments of the invention have been set forth in detail, those skilled in the art who have reviewed the present disclosure will readily appreciate that other embodiments can be realized within the scope of the invention. For example, numerical values, fabrication methods, and specific materials and uses are illustrative rather than limiting. Therefore, the present invention should be construed as limited only by the appended claims.

I claim:

1. An optical element switch comprising:

a composite comprising a conductive polymer and a semiconducting carbon nanotube material;

at least one electrode in electrical communication with the composite;

an input waveguide for applying radiation to the composite;

a first output waveguide for receiving the radiation from the composite when the composite is in a first state in response to a switching signal from the at least one electrode; and a second output waveguide for receiving the radiation from the composite when the composite is in a second state in response to the switching signal from the at least one electrode.

2. The optical switch of claim 1, wherein the composite is provided as a plurality of layers to form a Bragg grating.

* * * * *